(12) United States Patent
Hollingsworth et al.

(10) Patent No.: US 8,039,413 B2
(45) Date of Patent: Oct. 18, 2011

(54) TRANSPARENT CERAMICS AND METHODS OF PREPARATION THEREOF

(75) Inventors: Joel P. Hollingsworth, Oakland, CA (US); Joshua D. Kuntz, Livermore, CA (US); Zachary M. Seeley, Pullman, WA (US); Thomas F. Soules, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/603,247

(22) Filed: Oct. 21, 2009

(65) Prior Publication Data
US 2010/0102464 A1  Apr. 29, 2010

Related U.S. Application Data

(60) Provisional application No. 61/108,104, filed on Oct. 24, 2008.

(51) Int. Cl.
*C04B 35/50* (2006.01)
(52) U.S. Cl. ............ 501/152; 264/681; 264/86
(58) Field of Classification Search .......... None
See application file for complete search history.

(56) References Cited

U.S. PATENT DOCUMENTS

| | | | |
|---|---|---|---|
| 4,013,501 A | 3/1977 | Van Uitert et al. | 156/605 |
| 4,315,832 A | 2/1982 | Pastor et al. | 252/301.4 |
| 4,841,195 A | 6/1989 | De With et al. | 313/636 |
| 4,906,424 A | 3/1990 | Hughes et al. | 264/63 |
| 7,427,577 B2 * | 9/2008 | Tang et al. | 501/152 |
| 2004/0109808 A1 | 6/2004 | Lee et al. | 423/263 |
| 2005/0215419 A1 * | 9/2005 | Takagimi et al. | 501/152 |

FOREIGN PATENT DOCUMENTS

| | | |
|---|---|---|
| EP | 0 067 521 | 12/1982 |
| EP | 0 926 106 A1 | 6/1999 |
| WO | 01/27046 A1 | 4/2001 |
| WO | 02/057198 A2 | 7/2002 |

(Continued)

OTHER PUBLICATIONS

Tsai. et al., "Controlled Gelation and Sintering of Monolithic Gels Prepared from γ-Alumina Fume Powder" Supported by the National Science Council of Taiwan under Grant No. NSC79-0402-E011-07. Manuscript No. 197368. Received Aug. 13, 1990, approved Jan. 10, 1991.

(Continued)

*Primary Examiner* — Mary F Theisen
(74) *Attorney, Agent, or Firm* — Eddie E. Scott; James S. Tak

(57) ABSTRACT

According to one embodiment, a method for forming a transparent ceramic preform includes forming a suspension of oxide particles in a solvent, adding the suspension to a mold of a desired shape, and uniformly curing the suspension in the mold for forming a preform. The suspension includes a dispersant but does not include a gelling agent. In another embodiment, a method includes creating a mixture without a gelling agent, the mixture including: inorganic particles, a solvent, and a dispersant. The inorganic particles have a mean diameter of less than about 2000 nm. The method also includes agitating the mixture, adding the mixture to a mold, and curing the mixture in the mold at a temperature of less than about 80° C. for forming a preform. Other methods for forming a transparent ceramic preform are also described according to several embodiments.

30 Claims, 3 Drawing Sheets

FOREIGN PATENT DOCUMENTS

WO  02/057198 A3  7/2002

OTHER PUBLICATIONS

R. Clasen, Preparation and Sintering of High-Density Green Bodies to High Purity Silica Glasses Journal of Non-Crystalline Solids 89 (1987) 335-344, North Holland, Amsterdam.

Kosmač et al., "Hydrolysis-Assisted Solidification (HAS): A New Setting Concept for Cermanic Net-Shaping" Journal of European Ceramic Society 17 (1997) 427-423, 1996 Elsevier Science Limited, Great Britain.

Kong et al., "Hydrolysis-assisted solidification of alumina slurry dispersed in silica sol without de-airing process" Materials Science and Engineering A 426 (2006) 36-42 www.elsevier.com.locate.msea.

Halverson, D.C. "Boron Carbide-Aluminum Cermets" Lawrence Livermore National Laboratory, UCRL No. 95119, 1986.

Fischer, S.H.; Grubelich, M.C., "Theoretical Energy Release of Thermites, Intermetallics, and Combustible Metals" Proceedings from the 24$^{th}$ International Pyrotechnics Seminar, 1998, Monterey, CA, pp. 231-286.

Brinker, C.J.; Scherrer, G., "Chapter 11: Sintering" Sol-gel Science, 1990, Wiley.

Gash, A.E.; Simpson, R.L.; Tillotson, T.M.; Satcher, J.H., Jr.; Hrubesh, L.W. "Making Nanostructured Pyrotechnics in a Beaker" Proc. 27$^{th}$ Int. Pyrotech. Sem. Grand Junctions, CO, Jul. 15-21, 2000, p. 41-53.

Tillotson, T.M.; Gash, A.E.; Simpson, R.L.; Hrubesh, L.W.; Poco, J.F., "Nanostructured energetic materials using sol-gel methodologies" J. Non-Cryst. Solids 2001, 285, 338-345.

Invitation to Pay Additional Fees from application No. PCT/US2009/061876 mailed on Jun. 9, 2010.

YAG ceramic processed by slip casting via aqueous slurries Ceramics International, Elsevier, Amsterdam, NL, LNKD, Journal of Ceramint, Oct. 18, 2006, vol. 34, No. 2, Jan. 18, 2008, p. 397-401.

Sherman, J., "Thermal Compensation of a CW-Pumped ND: YAG Laser" Applied Optics, Optical Society of America, Washington, US., vol. 37, No. 33, Nov. 20, 1998, p. 7789-7796.

Wong, S.K. et al., "Eye-Safe ND:YAG Laser" Applied Physics Letters, American Institute of Physics, New York, US, vol. 57, No. 7, Aug. 13, 1990, p. 650-652.

International Search Report and Written Opinion from PCT Application No. PCT/US2009/061876 dated Aug. 3, 2010.

\* cited by examiner

TRANSPARENT CERAMICS AND METHODS OF PREPARATION THEREOF

RELATED APPLICATIONS

This application claims priority to provisional U.S. appl. No. 61/108,104 filed on Oct. 24, 2008, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to transparent ceramics, and particularly, to the preparation of transparent ceramics by gel casting nano-sized particles.

BACKGROUND

Exceptional ceramic parts having laser optical transparency have been fabricated and are commercially available. These parts are typically made starting with a very pure co-precipitated powder which is then slip cast in the presence of a gelling agent to form the green structure or preform prior to sintering. A uniform slurry of high purity powder is poured into a plaster mold which sucks the water out of the slurry by capillary forces and produces the green structure after drying. Using fluid flow and surface tension to consolidate the ceramic powder allows parts to be made with a uniform powder packing. However, because the mold removes the water, slip casting can only be used for relatively thin parts. The need for a very porous surface on the mold also introduces another variable in the green structure fabrication. The porous mold usually made of commercial gypsum may also be a source of contamination. Moreover, the presence of the gelling agent, or its by products, in the final structure is an impurity that adversely affects the optical properties of the ceramic. Cold uniaxial pressing and cold isostatic pressing have also been used to make transparent parts. However, inter-particle friction during the pressing process tends to prevent densification in the center of the part so that size of the part must be kept small enough that this does not cause porosity.

In order to increase the driving force for sintering, a finer nano-sized powder than that produced by precipitation may be used. This can be especially important for achieving high transparency needed for lasers. Finer particles because of their increased surface area sinter more easily. Very small trapped pores are also less effective in scattering light.

However, smaller nano-sized particles behave differently than larger (such as micrometer) sized particles during green structure consolidation. For instance, smaller particles experience more friction as they move past one another in a die making it more difficult to produce a uniform structure through cold pressing, especially where larger parts are desired. The higher surface area of finer particles also requires more water for wetting making it difficult to get the solids loading high for slipcast slurries. As a result, after slip casting there is significant shrinkage on drying often leading to cracking and other problems. Finer particles are more susceptible to surface-area-dependent chemical reactions, as may occur between a porous mold and certain ceramic powders. Therefore, a method of preparing transparent ceramics using nano-sized particles without the problems associated with traditional methods would be very beneficial to the advancement of this field.

SUMMARY

According to one embodiment, a method for forming a transparent ceramic preform includes forming a suspension of oxide particles in a solvent, adding the suspension to a mold of a desired shape, and uniformly curing the suspension in the mold for forming a preform. The suspension includes a dispersant but does not include a gelling agent.

In another embodiment, a method for forming a transparent ceramic preform includes forming a suspension of oxide particles comprised primarily of yttrium aluminum garnet (YAG) formed via flame-spray pyrolysis (FSP) having a primary particle diameter of less than about 200 nm in a solvent comprising de-ionized water and ammonia, the solvent having a pH of about 10.5, wherein the suspension includes ammonium acrylate used as a dispersant, a volume percent of solids in a total volume of the suspension is between about 25 vol. % and about 45 vol. %., and the suspension does not include a gelling agent. The method also includes agitating the suspension, adding the suspension to a mold of a desired shape wherein the mold is sealed after the adding, heating the suspension in the mold to a temperature of about 50° C., holding the temperature about constant for a time of between about 10 hours and about 24 hours to produce a stable suspension, removing the stable suspension from the mold, and allowing the stable suspension to dry at a temperature of about 20° C. until suitably dry for forming a preform.

In yet another embodiment, a method includes creating a mixture without a gelling agent, the mixture including: inorganic particles, a solvent, and a dispersant. The inorganic particles have a mean diameter of less than about 2000 nm. The method also includes agitating the mixture, adding the mixture to a mold, and curing the mixture in the mold at a temperature of less than about 80° C. for forming a preform.

Other aspects and embodiments of the present invention will become apparent from the following detailed description, which, when taken in conjunction with the drawings, illustrate by way of example the principles of the invention.

DETAILED DESCRIPTION

Figure 1:
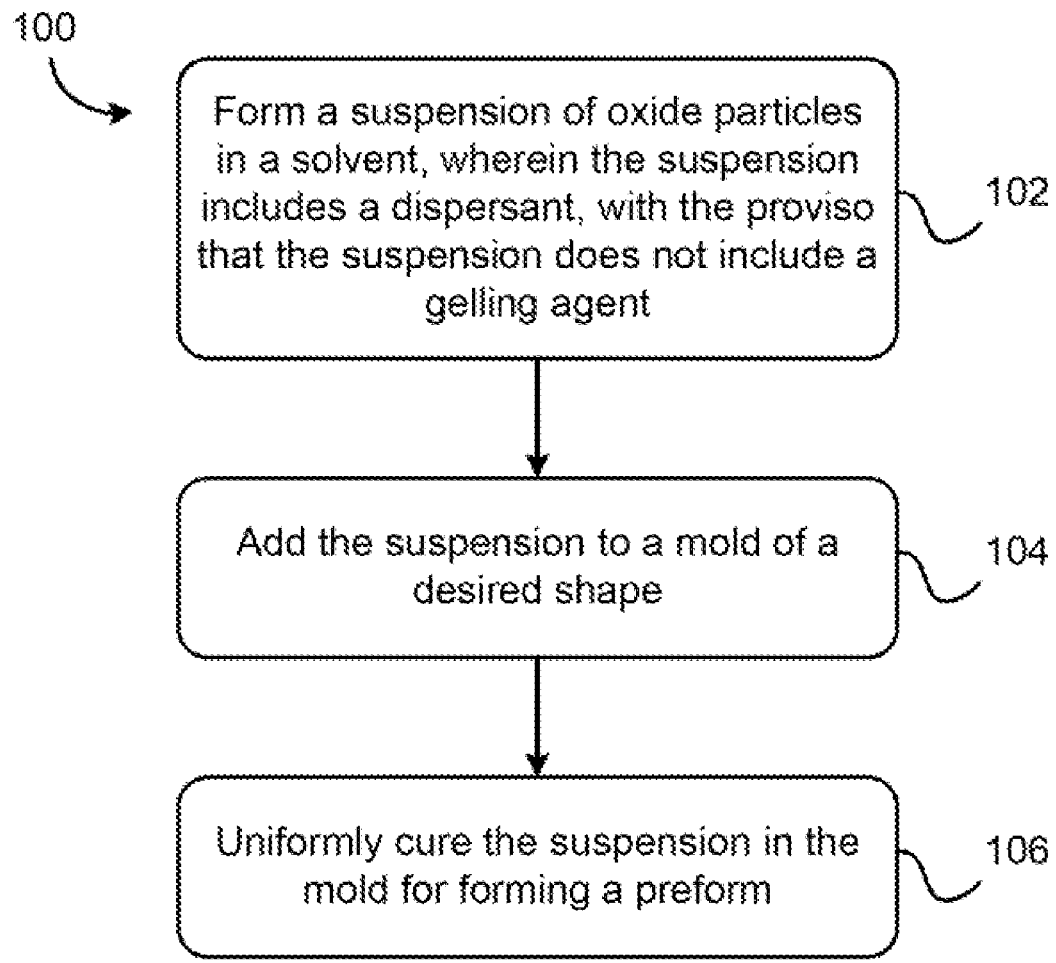
FIG. 1 is a flowchart showing a method for forming a transparent ceramic preform according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value. For example, a pH of about 9 refers to a pH of 9±0.9, a temperature of about 50° C. refers to a temperature of 50° C.±5° C., etc.

Disclosed herein, according to some embodiments, is a method for fabricating a ceramic green structure and/or ceramic preform, the products made therefrom, and applications of materials made using this and other methods. The methods disclosed herein include new methods of gel casting to form a preform.

According to one general embodiment, a method for forming a transparent ceramic preform comprises forming a suspension of oxide particles in a solvent, wherein the suspension includes a dispersant, with the proviso that the suspension does not include a gelling agent. The method also includes adding the suspension to a mold of a desired shape, and uniformly curing the suspension in the mold for forming a preform.

According to another general embodiment, a method for forming a transparent ceramic preform comprises forming a suspension of oxide particles comprised primarily of yttrium aluminum garnet (YAG) formed via flame-spray pyrolysis (FSP) having a primary particle diameter of less than about 200 nm in a solvent comprising de-ionized water and ammonia, the solvent having a pH of about 10.5, wherein the suspension includes ammonium acrylate used as a dispersant, wherein a volume percent of solids in a total volume of the suspension is between about 25 vol. % and about 45 vol. %., with the proviso that the suspension does not include a gelling agent. The method also includes agitating the suspension, adding the suspension to a mold of a desired shape wherein the mold is sealed after the adding, heating the suspension in the mold to a temperature of about 50° C., holding the temperature about constant for a time of between about 10 hours and about 24 hours to produce a stable suspension, removing the stable suspension from the mold, and allowing the stable suspension to dry at a temperature of about 20° C. until suitably dry for forming a preform.

In another general embodiment, a method comprises creating a mixture of inorganic particles, a solvent and a dispersant, the inorganic particles having a mean diameter of less than about 2000 nm, agitating the mixture, adding the mixture to a mold, and curing the mixture in the mold at a temperature of less than about 80° C. for forming a preform, with the proviso that no gelling agent is added to the mixture.

According to one embodiment, a slurry or suspension of fine to very fine oxide particles are formed in a solvent. The solvent liquid is preferably purified de-ionized or distilled water. Other solvents can be used if they evaporate completely or nearly completely at or below 200° C., or if they decompose or are capable of being incorporated into the formed preform, without leaving any ash or residue. Some other solvents include alcohols, aldehydes, and other organic solvents.

When using an aqueous suspension of oxide particles, the pH of the water may be adjusted to be between about 2 and about 5, or between about 8 and about 12, depending on the oxide particles used and any additional components in the solvent. In one example, when yttrium aluminum garnet (YAG) particles that are produced via flame spray pyrolysis (FSP) are used as the oxide particles, the pH of the water may preferably be between about 9 and about 11, even more preferably about 10.5. The most preferred pH may vary depending on the oxide being suspended and may be chosen to result in a zeta-potential for the suspension as far from zero as possible to produce a good suspension.

In some approaches, the pH may be adjusted with an easily removable base or acid, and in some preferred approaches, the base may be ammonia or the acid may be nitric acid. Any other base or acid may also be used to obtain the desired pH. Additives which react with water as the gel cures in later processing, altering the pH of the solvent, are known in the prior art, and may optionally be used to adjust the pH. These include but are not limited to urea, biuret, formamide, ammonium carbamate, and insoluble additives such as aluminum nitride.

In some approaches, the oxide particles may be prepared as a powder. This powder may be prepared using flame-spray pyrolysis (FSP). In FSP, an organo-metallic containing the stoichiometrically correct amounts of the metal ions is burned in a suitable fuel. This method for obtaining nano-sized, spherical particles of oxides is known in the prior art. In this embodiment, the smoke is comprised primarily of the desired oxide particle powder. Other methods for obtaining these nano-powders, such as by fuming, co-precipitation, and mixing of powders, are also possible. Other methods of forming/acquiring the particles include crushing, e.g., in a pin mixer or ball mill, purchasing the particles from a supplier, screening fines from a source; etc. Of course, any other method may be used to produce the oxide particle powder that results in the oxide particles having the desired particle diameter range.

One unique aspect of the methods for preform production described herein is that no effective amount of a polymer, binder, and/or other gelling agent may be added to the solvent and preferably none is present at all. For example, the preform may be formed without the aid of the binder and/or polymer and/or gelling agent (used interchangeably herein). A "gelling agent" as used herein is generally defined as any material that promotes agglomeration of the particles. In addition, many gelling agents exhibit at least one of the following properties: nonevaporative at 50° C.; is capable of, or would tend to exhibit, crosslinking at some point after addition. In contrast, typical gel-casting methods require one of these gelling agents to be added in order to properly gel.

In some approaches, a small amount of dispersant may be added to the suspension to achieve the solids loading for gel-casting. Some suitable organic dispersants include ammonium polymethacrylate (DARVAN C-N), an ammonium polymethacrylate, DISPEX MO, and/or a narrow molecular weight range ammonium polyacrylate. Alternatively, free metal ions such as yttrium (3+) and/or aluminum (3+) may be used as the dispersant. When free metal ions are used as the dispersant, they may be added to the solvent as a metal salt, e.g., a nitrate salt. Particular care is taken so as not to disturb the phase purity of the finished ceramic. Sodium silicate solution or other inorganic dispersants may also be suitable dispersants. In some preferred approaches, ammonium acrylate dispersants may be used, as they generally have an advantage over other dispersants in that they completely burn out during subsequent processing, thereby not leaving a residue. Enough dispersant may be added so as to stabilize the suspension and decrease a viscosity of the suspension. According to some embodiments, the amount of dispersant added to the suspension may be between 0.5 wt. % to about 3.0 wt. % of the weight of the solids when using organic dispersants, and between about 0.01 wt. % to about 0.5 wt. % of the weight of solids in the case of metal salts. The preferred weight of dispersants added to the suspension may be obtained by constructing a series and determining what level of dispersants results in the maximum solids content of the suspension. Of course, the amount of dispersant used may vary depending on the components of the suspension, and may be further refined based on experimentation.

According to some embodiments, the powder particles may have a primary particle diameter between about 5 nm and about 2000 nm, more preferably between about 5 nm and about 200 nm, and even more preferably between about 10 nm and about 80 nm. A primary particle diameter may include a mean particle diameter, a median particle diameter, etc. In the example where the oxide particle comprises YAG, this corresponds to a surface area BET measurement of about 80 $m^2/g$ to about 200 $m^2/g$. The particle size defined here is an individual grain size. Aggregate sizes generally may be larger.

In some approaches, the nano-scale particle powders may preferably be spherical in morphology and/or produced via flame-spray pyrolysis (FSP). Some oxide particles that may be used with methods disclosed herein include, but are not limited to, yttrium aluminum garnet (YAG), neodymium doped YAG (Nd:YAG), various other doped or un-doped rare-earth garnets including yttrium scandium aluminum garnet, lutetium aluminum garnet, gadolinium gallium garnet, etc., yttrium oxide, ytterbium doped yttrium oxide, and other doped cubic oxides including scandia, lutetia, zirconia, etc.

According to some embodiments, mechanical stirring, centrifugal mixing, or some other method of agitating the suspension may be used as the oxide particles are added to the solvent and/or after the oxide particles are added to the solvent to form the suspension. Also, the pH of the solvent and/or the suspension may be controlled.

Subsequently, the thick suspension is subjected to a form of high energy agitation to remove trapped air and wet all the particles thoroughly, in some embodiments. The high energy agitation preferably is thorough and energetic enough to break up powder agglomerates and disperse the particles thoroughly and uniformly throughout the suspension. Suitable forms of high energy agitation include subjecting the suspension to an ultrasonic vibration, using a very high shear mixer, and some form of a high energy ball mill with media appropriate to break up the nano-sized and larger agglomerates. Generally, after the high energy agitation, the viscosity of the suspension drops dramatically and additional oxide particles may be added, thereby producing a suspension with an even higher weight percent of oxide particles.

The total amount of oxide particles added to a given quantity of solvent preferably is greater than or approximately equal to the tap density of the dry particle powder, according to some embodiments. The amount of oxide particles added is generally limited to achieve complete wetting, dispersion; and mixing of the particle powder and solvent and to have a suspension that pours freely. Nevertheless, preferable powder loading is as high as possible following the high energy agitation. Most preferably, the suspension may be composed of at least about 15 vol. % oxide particles or higher. In other approaches, the suspension may be composed of between about 15 vol. % to about 60 vol. % oxide particles, more preferably between about 15 vol. % to about 50 vol. % oxide particles, even more preferably between about 25 vol. % to about 45 vol. % oxide particles.

After the suspension is produced, it is poured and/or transferred into a mold of a desired shape. In one preferred approach, the mold is impermeable. One of the advantages of this method to produce transparent ceramic performs is that many shapes may be achieved beyond that possible through conventionally used methods, which are generally limited to flat shapes due to the high pressure conditions used in the processing. In the present approach, the suspension may be allowed to gel in the mold until stable. The mold may be designed such that the stable suspension may be removed therefrom without excessive stresses being exerted on the suspension, thereby resulting in less chance of the suspension being harmed upon removal from the mold.

It has been unexpectedly found that the suspension containing a high loading of very fine (nano-sized) oxide particles may gel without the aid of gel forming polymers, binders, or other types of gelling agents. Curing preferably continues without drying until the preform is removed from the mold, resulting in no damage to the preform. In some approaches, curing may occur for between about 12 to about 72 hours (or longer) at room temperature (e.g., about 20° C.). In other approaches, the curing may occur for between about 4 hours to about 24 hours (or longer) at elevated temperatures, with the conditions preferably being chosen such that no gas is evolved from the suspension (except for potentially negligible evaporation), e.g., via boiling or via dissociation of carbonic acid. Preferably, the suspension may be allowed to cure in a sealed container for between about 40 hours to about 84 hours at between about 20° C. to about 80° C. In other approaches, between about 40° C. and about 60° C., and most preferably, the suspension may be allowed to cure in a sealed container for between about 8 hours and about 100 hours at a temperature of about 50° C. In one preferred embodiment, the suspension is cured in a sealed container (possibly the mold) at a temperature of about 50° C. for a period of time of about 72 hours. Of course, the temperature may vary during the curing, but the temperature may be held at about a constant temperature.

In addition to enabling gelation of the suspension in the mold, the high loading may result in less shrinkage during drying and thereby result in less susceptibility to cracking. This is in contrast to prior art methods of gelation, where drying during gelation may lead to cracking of the preform. The gelled preform may be dried in a fashion that is slow and uniform, such that the risk of cracking is substantially reduced. More preferably, the drying preform may be supported in such a way that all surfaces have similar access to air, and the drying may occur at room temperature (about 20° C.) until shrinkage ceases. Further, drying may be performed at an elevated temperature below the boiling point of the liquid according to some embodiments.

In some embodiments, any remaining solvent may be drained from the preform after the curing, and additional solvent may be added to the preform prior to the sintering to form a ceramic. The original solvent may be the same or different than the newly added solvent, and additional solvents may be added in successive drying steps, thereby allowing about complete replacement of any remaining original solvent in the preform with newly added solvent, prior to sintering to form a ceramic.

The dried preform may be handled after the drying. In some embodiments, the preform may be calcined. Calcination may comprise firing the preform in air at a temperature of between about 500° C. and about 1100° C. to remove any residual organic compounds or other residual substances and to create any desired phase change.

Subsequently, in some embodiments, the preform may be sintered using any prior art sintering method to create a transparent ceramic (polishing may be used to aid in producing the transparency of the ceramic).

Now referring to FIG. 1, a method 100 for forming a transparent ceramic preform may be described according to one embodiment. Of course, the method 100 may be carried out in any desired environment, and any of the above described conditions and/or descriptions may apply to the following method 100. The preform that is formed may or may not be transparent, but is capable of being polished, pressed, finished, sintered, etc., such that a transparent ceramic may be produced from the transparent ceramic preform.

In operation 102, a suspension of oxide particles is formed in a solvent. The suspension includes a dispersant, with the proviso that the suspension does not include a gelling agent. Note that the particles do not necessarily dissolve in the solvent; rather the solvent and particles typically form a slurry or mixture. In fact, "suspension" as used herein may refer to a slurry, a mixture, a combination, a blend, etc. A suspension is one preferred mode of the mixture of components described herein.

In operation 104, the suspension is added to a mold of a desired shape. Generally, the mold is impermeable, but is not so limited. The mold may be designed such that the stable suspension may be removed therefrom without excessive stresses being exerted on the suspension, thereby resulting in less chance of the suspension being harmed upon removal from the mold.

In operation 106, the suspension is uniformly or almost uniformly cured in the mold for forming a preform. Since it is very difficult to completely uniformly cure the suspension in the mold or in any other container, it is desirable to cure the suspension as close to uniformly as possibly, thereby reducing the chance of cracking and/or forming fault planes in the ceramic structure after curing. It has been surprisingly and unexpectedly found that the suspension gelled, even though no gelling agent was present.

Figure 2:
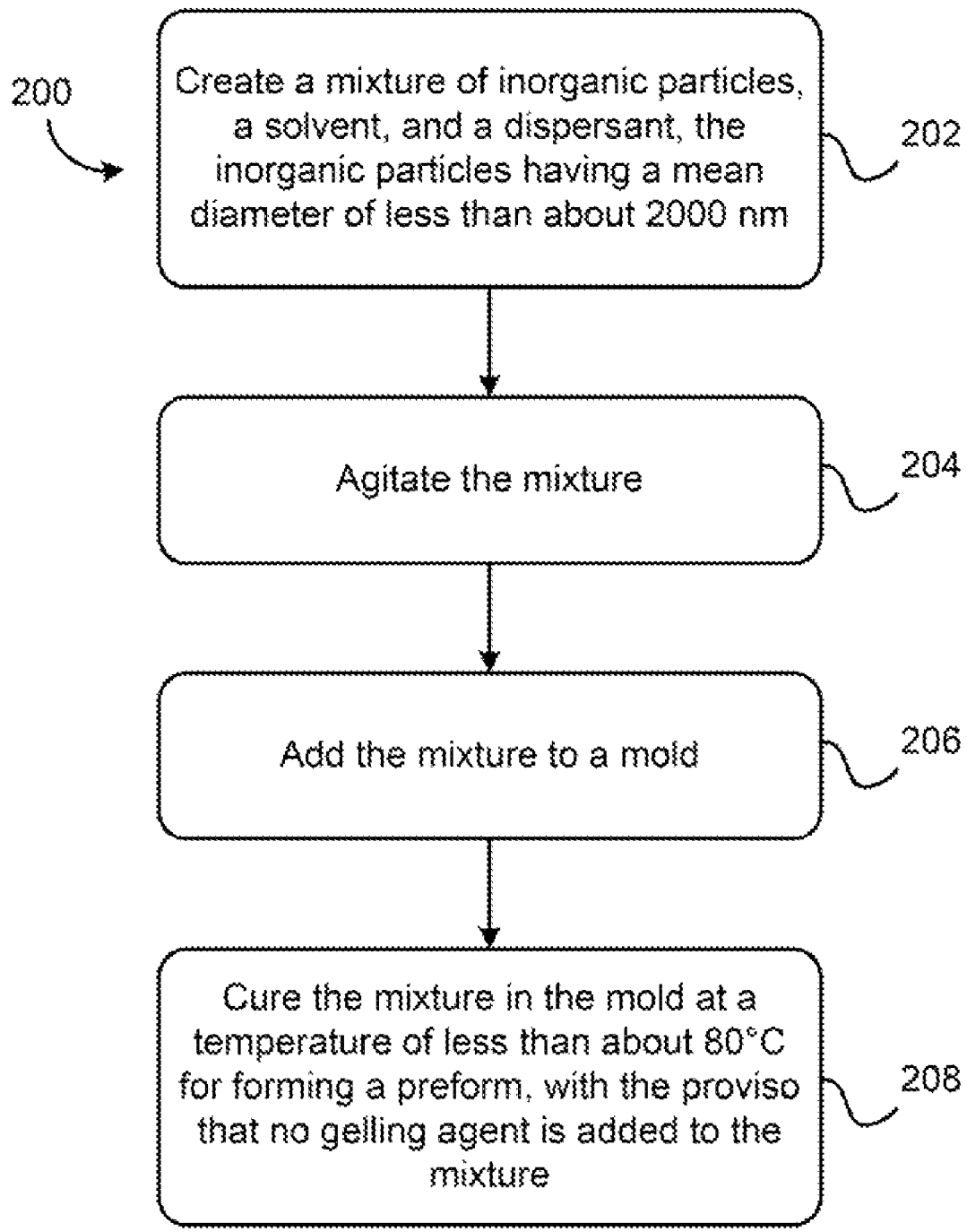
FIG. 2 is a flowchart showing a method for forming a transparent ceramic preform according to one embodiment.

Now referring to FIG. 2, another method 200 is described according to one embodiment. The method 200 may be carried out in any desired environment, and any of the above described conditions and/or descriptions may apply to the following method 200. The preform that is formed may or may not be transparent, but is capable of being polished, pressed, finished, sintered, etc., such that a transparent ceramic may be produced from the transparent ceramic preform.

In operation 202, a mixture is created of inorganic particles, a solvent, and a dispersant, the inorganic particles having a mean diameter of less than about 2000 nm. Note that the particles do not necessarily dissolve in the solvent; rather the solvent and particles typically form a slurry or suspension (used interchangeably herein).

In operation 204, the mixture is agitated. Any form of agitation may be used, such as mechanical stirring, ultrasonic-based agitation, centrifugal mixing, etc. As the mixture is agitated, the particles tend to become more refined, thereby allowing more particles to be added to the mixture. Therefore, operations 202 and 204 may be repeated until the desired volumetric percentage of particles to total volume is achieved in the mixture, such as between about 15 vol. % and about 60 vol. % particles.

In operation 206, the mixture is added to a mold. The mixture may be poured, scooped, dropped, or in any other way transferred to the mold. In some approaches, the mixture may be prepared in the mold, and therefore the method 200 would not include operation 206.

In operation 208, the mixture is cured in the mold at a temperature of less than about 80° C. for forming a preform, with the proviso that no gelling agent is added to the mixture. Surprisingly and unexpectedly, the mixture gels under these conditions, even though no gelling agent has been added to the mixture.

A select number of examples are described below. These examples are based on neodymium-doped yttrium-aluminum garnet (YAG) particle powder, produced via FSP such that the particle powder's average particle diameter is about 50 nanometers. Of course, the teachings of these examples may be applied using any oxide particle, such as those described above.

Figure 3:
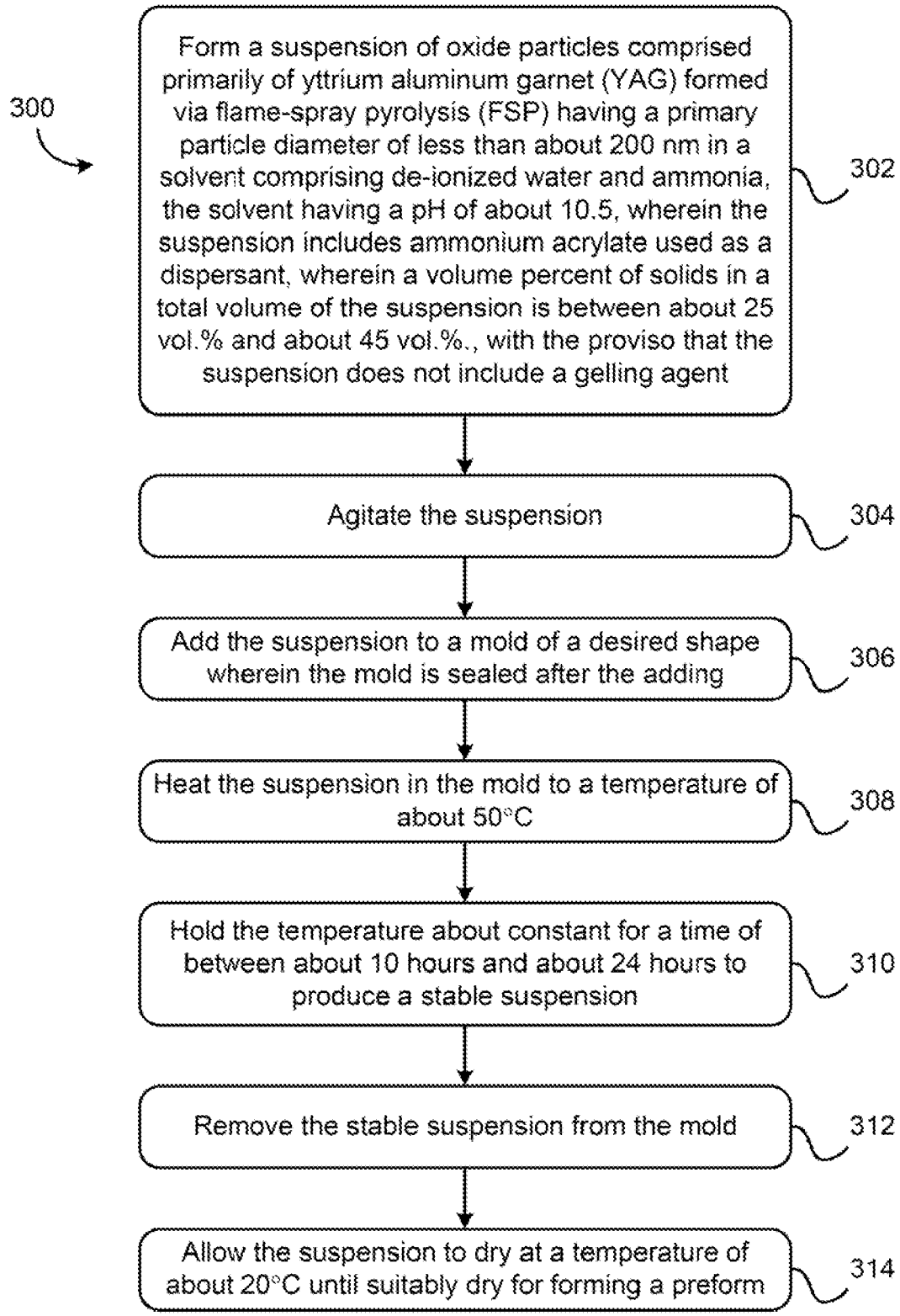
FIG. 3 is a flowchart showing a method according to another embodiment.

In one example, referring to FIG. 3, in operation 302, a weight of fine FSP prepared Nd:YAG powder with a BET measured surface area of approximately 20 $m^2$/g was suspended in de-ionized water containing ammonia with a pH of 10.5 in which ammonium polymethacrylate (DARVAN C) had been dissolved (0.015 parts by weight to 1 part Nd:YAG). The particle powder accounted for approximately 30 vol. % of the volume of the suspension.

As shown in operation 304, the suspension was prepared by alternately mixing in the particle powder with a polyethylene spatula, and then using a centrifugal mixer until a uniform, air-free paste was formed after which the suspension was placed under an ultrasonic horn until the mixture became pourable.

As shown in operation 306, this suspension was then poured into a polytetrafluoroethylene (TEFLON) mold. This mold was sealed.

As shown in operations 308-310, the suspension in the mold was heated to 50° C. for approximately 16 hours.

As shown in operation 312, the cured preform was allowed to cool before being removed from the mold. The preform was blotted to remove excess water, then wrapped in absorbent paper.

As shown in operation 314, the stable preform was allowed to dry for several days at room temperature (about 20° C.). The dry preform was sintered into a transparent ceramic part of a shape dictated by the shape of the mold.

According to another example, oxide particle powder from the previous example was suspended as above, but in dilute nitric acid solvent instead of water, with a pH of approximately 3. Urea was added to the suspension until 0.1 wt. % became dissolved in the suspension. The purpose of the urea is to release ammonia and change the pH during curing. The particle powder accounted for approximately 15 vol. % of the suspension's total volume. Mixing, agitation, curing, and drying proceeded similarly as was described in the previous example.

In another example, FSP prepared YAG powder was suspended in a solution of yttrium nitrate, aluminum nitrate, and urea. The pH was not controlled in any degree. The particle powder accounted for approximately 20 vol. % of the suspension's total volume. Nitrate concentrations were chosen such that the Y:Al ratio was 3:5, and the total nitrate concentration was such that less than 0.5% of metal atoms were added as nitrate. Three moles of urea were added per mole of metal ion. The suspension gelled under the same conditions as were described in the first example, and was dried in the same container to avoid preferential leaching of metal ions. The ceramic part sintered from this preform was substantially transparent, except for occasional white flecks.

Many of the embodiments disclosed herein may be useful for making ceramic laser parts for a tailored aperture ceramic laser (TACL). It may also provide a simple and elegant way to fabricate other transparent laser components and possibly scintillators for use in radiation detectors and transparent armor, such as windows and windshields on armored vehicles.

In addition, gel casting is a promising new method for forming ceramic parts prior to sintering. The ability to gel cast nano-sized ceramic particles made by flame-spray pyrolysis (FSP), or some other approach, without polymers to theoretical density could make this technique much more widely used in the ceramics industry. It is a particularly simple process and may be used to form parts of a wide variety of intricate shapes. The parts may be produced to an exceedingly exceptional quality after sintering the parts.

Other uses of the methods described herein include producing common ceramics, such as alumina and silica, via gel casting. These materials may also benefit from the particular gel casting methods described herein through easier and/or more predictable material composition.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming a transparent ceramic preform, the method comprising:
   forming a suspension of oxide particles in a solvent, wherein the suspension includes a dispersant, with the proviso that the suspension does not include a gelling agent;
   adding the suspension to a mold of a desired shape; and
   uniformly curing the suspension in the mold for forming a preform of gelled suspension.

2. The method of claim 1, wherein the oxide particles have a primary particle diameter of between about 5 nm and about 2000 nm.

3. The method of claim 1, wherein the oxide particles have a primary particle diameter of between about 10 nm and about 80 nm.

4. The method of claim 3, wherein the oxide particles are formed via flame-spray pyrolysis (FSP).

5. The method of claim 4, wherein the oxide particles comprise at least one of yttrium aluminum garnet (YAG), neodymium doped YAG, yttrium scandium aluminum garnet, lutetium aluminum garnet, gadolinium gallium garnet, yttrium oxide, ytterbium doped yttrium oxide, doped scandia, doped lutetia, doped zirconia, and mixtures thereof.

6. The method of claim 1, wherein the solvent has a pH of between about 2 and about 5 or between about 9 and about 12.

7. The method of claim 6, wherein a volume percent of solids in a total volume of the suspension is between about 15 vol. % and about 60 vol. %.

8. The method of claim 6, wherein a volume percent of solids in a total volume of the suspension is between about 25 vol. % and about 45 vol. %.

9. The method of claim 1, wherein the oxide particles comprise YAG, wherein the solvent has a pH of between about 9 and about 11, wherein a volume percent of solids in a total volume of the suspension is between about 25 vol. % and about 45 vol. %.

10. The method of claim 1, wherein the curing comprises:
    heating the suspension in the mold to a temperature of between about 20° C. and about 80° C.; and
    holding the temperature about constant for a time of between about 4 hours and about 72 hours for forming a preform.

11. The method of claim 10, wherein the mold is sealed during the curing, and wherein the suspension is heated to a temperature of about 50° C.

12. The method of claim 10, further comprising calcining the preform at a temperature of between about 500° C. and about 1100° C.

13. The method of claim 1, wherein the solvent comprises at least one of: water, ammonia, nitric acid, yttrium nitrate, aluminum nitrate, an alcohol, an aldehyde, an organic solvent, and urea.

14. The method of claim 1, wherein the dispersant is comprised of at least one of: an ammonium polymethacrylate, a narrow molecular weight range ammonium polyacrylate, a free metal ion salt, sodium silicate, and ammonium acrylate.

15. A method for forming a transparent ceramic preform, the method comprising:
    forming a suspension of oxide particles comprised primarily of yttrium aluminum garnet (YAG) formed via flame-spray pyrolysis (FSP) having a primary particle diameter of less than about 200 nm in a solvent comprising de-ionized water and ammonia, the solvent having a pH of about 10.5, wherein the suspension includes ammonium acrylate used as a dispersant, wherein a volume percent of solids in a total volume of the suspension is between about 25 vol. % and about 45 vol. %, with the proviso that the suspension does not include a gelling agent;
    agitating the suspension;
    adding the suspension to a mold of a desired shape wherein the mold is sealed after the adding;
    heating the suspension in the mold to a temperature of about 50° C.;
    holding the temperature about constant for a time of between about 10 hours and about 24 hours to produce a stable suspension;
    removing the stable suspension from the mold; and
    allowing the stable suspension to dry at a temperature of about 20° C. until suitably dry for forming a preform.

16. A method of forming a transparent ceramic, the method comprising:
    sintering the transparent ceramic preform from claim 15.

17. A method, comprising:
    creating a mixture of inorganic particles, a solvent and a dispersant, the inorganic particles having a mean diameter of less than about 2000 nm;
    agitating the mixture;
    adding the mixture to a mold; and
    curing the mixture in the mold at a temperature of less than about 80° C. for gelling the mixture,
    with the proviso that no gelling agent is added to the mixture.

18. The method of claim 17, further comprising forming the particles via flame spray pyrolysis.

19. The method of claim 17, wherein the particles are selected from a group consisting of yttrium aluminum garnet (YAG), neodymium doped YAG, doped rare earth garnets, undoped rare earth garnets, yttrium oxide, ytterbium doped yttrium oxide, doped cubic oxides, and mixtures thereof.

20. The method of claim 17, wherein the particles are neodymium doped yttrium aluminum garnet (Nd:YAG).

21. The method of claim 17, wherein a loading of the solids in the mixture is between about 15 vol. % and about 60 vol. % based on a total volume of the mixture.

22. The method of claim 17, wherein a pH of the solvent is about 9 or more.

23. The method of claim 17, wherein a pH of the solvent is about 5 or less.

24. The method of claim 17, wherein the curing includes maintaining the mixture at a mean temperature of less than about 60° C. for less than about 100 hours.

25. The method of claim 17, wherein the curing is performed under conditions that no gas is evolved from the mixture.

26. The method of claim 17, further comprising calcining the preform.

27. The method of claim 17, further comprising sintering the preform after the curing for forming a transparent ceramic.

28. The method of claim 27, further comprising draining any remaining solvent from the preform after the curing, and adding additional solvent to the preform prior to the sintering.

29. The method of claim 1, further comprising sealing the mold after the adding.

30. The method of claim 17, wherein the mold is impermeable, and further comprising sealing the mold after the adding the mixture thereto.

* * * * *